United States Patent
Wu

(10) Patent No.: US 10,575,356 B2
(45) Date of Patent: Feb. 25, 2020

(54) DEVICE AND METHOD OF CONFIGURING A SECONDARY NODE AND REPORTING IN DUAL CONNECTIVITY

(71) Applicant: HTC Corporation, Taoyuan (TW)

(72) Inventor: Chih-Hsiang Wu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 16/039,354

(22) Filed: Jul. 19, 2018

(65) Prior Publication Data

US 2019/0029062 A1    Jan. 24, 2019

Related U.S. Application Data

(60) Provisional application No. 62/535,256, filed on Jul. 21, 2017.

(51) Int. Cl.
*H04W 76/15* (2018.01)
*H04W 24/10* (2009.01)
*H04W 72/04* (2009.01)
*H04W 76/27* (2018.01)

(52) U.S. Cl.
CPC .......... *H04W 76/15* (2018.02); *H04W 24/10* (2013.01); *H04W 72/0453* (2013.01); *H04W 76/27* (2018.02)

(58) Field of Classification Search
CPC . H04W 76/15; H04W 24/10; H04W 72/0453; H04W 76/27
See application file for complete search history.

(56) References Cited

U.S. PATENT DOCUMENTS

2016/0081020 A1* 3/2016 Rahman ............ H04W 52/0209
370/311
2016/0165612 A1* 6/2016 Luo .................. H04L 5/001
370/329

FOREIGN PATENT DOCUMENTS

EP      3 018 955 A1    5/2016
WO   2016/021821 A1    2/2016

OTHER PUBLICATIONS

Search Report dated Dec. 7, 2018 for EP application No. 18184730.2, pp. 1-5.

(Continued)

*Primary Examiner* — Dady Chery
(74) *Attorney, Agent, or Firm* — Winston Hsu

(57) ABSTRACT

A network comprising a first base station (BS) and a second BS for Dual Connectivity (DC), comprising the first BS receiving a first plurality of communication device capabilities of a communication device from the communication device, a third BS or a core network, wherein the first plurality of communication device capabilities comprise a first maximum reception bandwidth (RX_BW) for a first frequency band; the first BS transmitting a first SN Addition Request message to the second BS, to configure the second BS as a first SN for the communication device, wherein the first SN Addition Request message comprises the first plurality of communication device capabilities; and the second BS determining a first RX_BW and a location of the first RX_BW on a first carrier according to the first maximum RX_BW.

11 Claims, 4 Drawing Sheets

(56) References Cited

OTHER PUBLICATIONS

3GPP TS 36.300 V14.3.0 (Jun. 2017), "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 14)", XP051306328, pp. 1-331.
Office action dated Mar. 28, 2019 for the Taiwan application No. 107124999, filing date Jul. 19, 2018, pp. 1-13.

\* cited by examiner

DEVICE AND METHOD OF CONFIGURING A SECONDARY NODE AND REPORTING IN DUAL CONNECTIVITY

CROSS REFERENCE TO RELATED APPLICATIONS

This application claims the benefits of U.S. Provisional Applications No. 62/535,256 filed on Jul. 21, 2017, which is incorporated herein by reference.

BACKGROUND OF THE INVENTION

1. Field of the Invention

The present invention relates to a device and a method used in a wireless communication system, and more particularly, to a device and a method of configuring a Secondary Node (SN) and reporting in Dual Connectivity (DC).

2. Description of the Prior Art

A new radio (NR) system, developed recently in 3rd generation partnership project (3GPP), is regarded as a NR interface and radio network architecture that provides a high data rate, low latency, packet optimization, and improved system capacity and coverage.

SUMMARY OF THE INVENTION

The present invention therefore provides a communication device and method for configuring a Secondary Node (SN) and reporting in Dual Connectivity (DC) to solve the abovementioned problem.

A network comprising a first base station (BS) and a second BS for Dual Connectivity (DC), comprising the first BS receiving a first plurality of communication device capabilities of a communication device from the communication device, a third BS or a core network, wherein the first plurality of communication device capabilities comprise a first maximum reception bandwidth (RX_BW) for a first frequency band; the first BS transmitting a first SN Addition Request message to the second BS, to configure the second BS as a first SN for the communication device, wherein the first SN Addition Request message comprises the first plurality of communication device capabilities; the second BS determining a first RX_BW and a location of the first RX_BW on a first carrier according to the first maximum RX_BW; the second BS generating a first Secondary Cell Group (SCG) configuration configuring the communication device to connect to a first cell of the second BS in DC with the first BS and the second BS, wherein the first SCG configuration comprises a cell identity of the first cell, a first absolute radiofrequency channel number (ARFCN), the first RX_BW and the location of the first RX_BW; the second BS transmitting a first SN Addition Request Acknowledge message comprising the first SCG configuration to the first BS in response to the first SN Addition Request message; and the first BS generating a first radio resource control (RRC) message comprising the first SCG configuration, and transmitting the first RRC message to the communication device.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
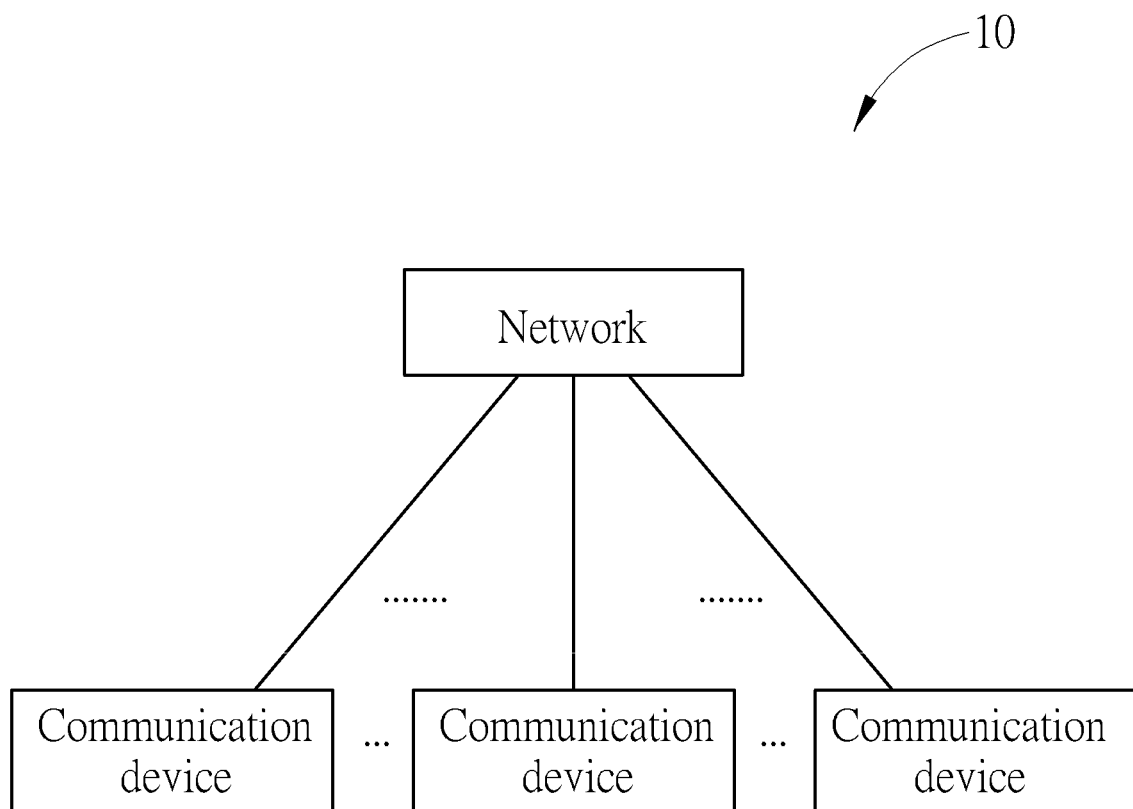
FIG. 1 is a schematic diagram of a wireless communication system according to an example of the present invention.

FIG. 1 is a schematic diagram of a wireless communication system 10 according to an example of the present invention. The wireless communication system 10 is briefly composed of a network and a plurality of communication devices. The network and a communication device may communicate with each other via one or more carriers of licensed band(s) and/or unlicensed band(s). The network and the communication device may communicate with each other via one or multiple cells (e.g., multiple carriers) belonging to one or multiple base stations (BSs). The abovementioned cells may be operated in the same or different duplexing modes, i.e., frequency-division duplexing (FDD), time-division duplexing (TDD) or flexible duplexing.

In FIG. 1, the network and the communication devices are simply utilized for illustrating the structure of the wireless communication system 10. The network may include a radio access network (RAN) and a core network (CN). The RAN may include at least one base station. The RAN may be an evolved Universal Terrestrial Radio Access Network (E-UTRAN) or a new radio (NR) RAN (or called a fifth generation (5G) RAN). The CN may be an Evolved Packet Core (EPC) network or a 5G core (5GC) network.

A communication device may be a user equipment (UE), a mobile phone, a laptop, a tablet computer, an electronic book, a portable computer system, a vehicle, a ship or an aircraft. In addition, the network and the communication device can be seen as a transmitter or a receiver according to direction (i.e., transmission direction), e.g., for an uplink (UL), the communication device is the transmitter and the network is the receiver, and for a downlink (DL), the network is the transmitter and the communication device is the receiver.

Figure 2:
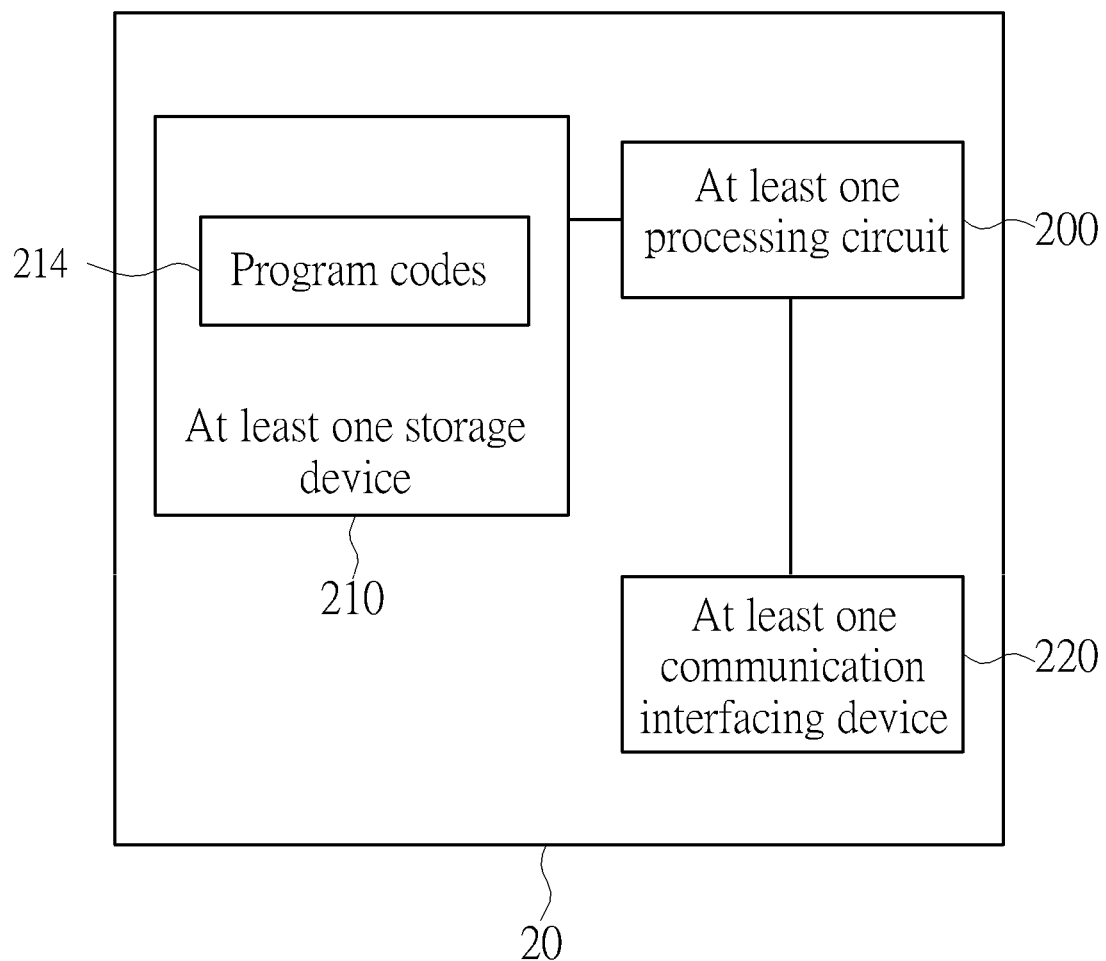
FIG. 2 is a schematic diagram of a communication device according to an example of the present invention.

FIG. 2 is a schematic diagram of a communication device 20 according to an example of the present invention. The communication device 20 may be a communication device or the network shown in FIG. 1, but is not limited herein. The communication device 20 may include at least one processing circuit 200 such as a microprocessor or Application Specific Integrated Circuit (ASIC), at least one storage device 210 and at least one communication interfacing device 220. The at least one storage device 210 may be any data storage device that may store program codes 214, accessed and executed by the at least one processing circuit 200. Examples of the at least one storage device 210 include but are not limited to a subscriber identity module (SIM), read-only memory (ROM), flash memory, random-access memory (RAM), hard disk, optical data storage device, non-volatile storage device, non-transitory computer-readable medium (e.g., tangible media), etc. The at least one communication interfacing device 220 is preferably at least one transceiver and is used to transmit and receive signals (e.g., data, messages and/or packets) according to processing results of the at least one processing circuit 200.

In the following examples, a UE is used to represent a communication device in FIG. 1, to simplify the illustration of the examples.

Figure 3:
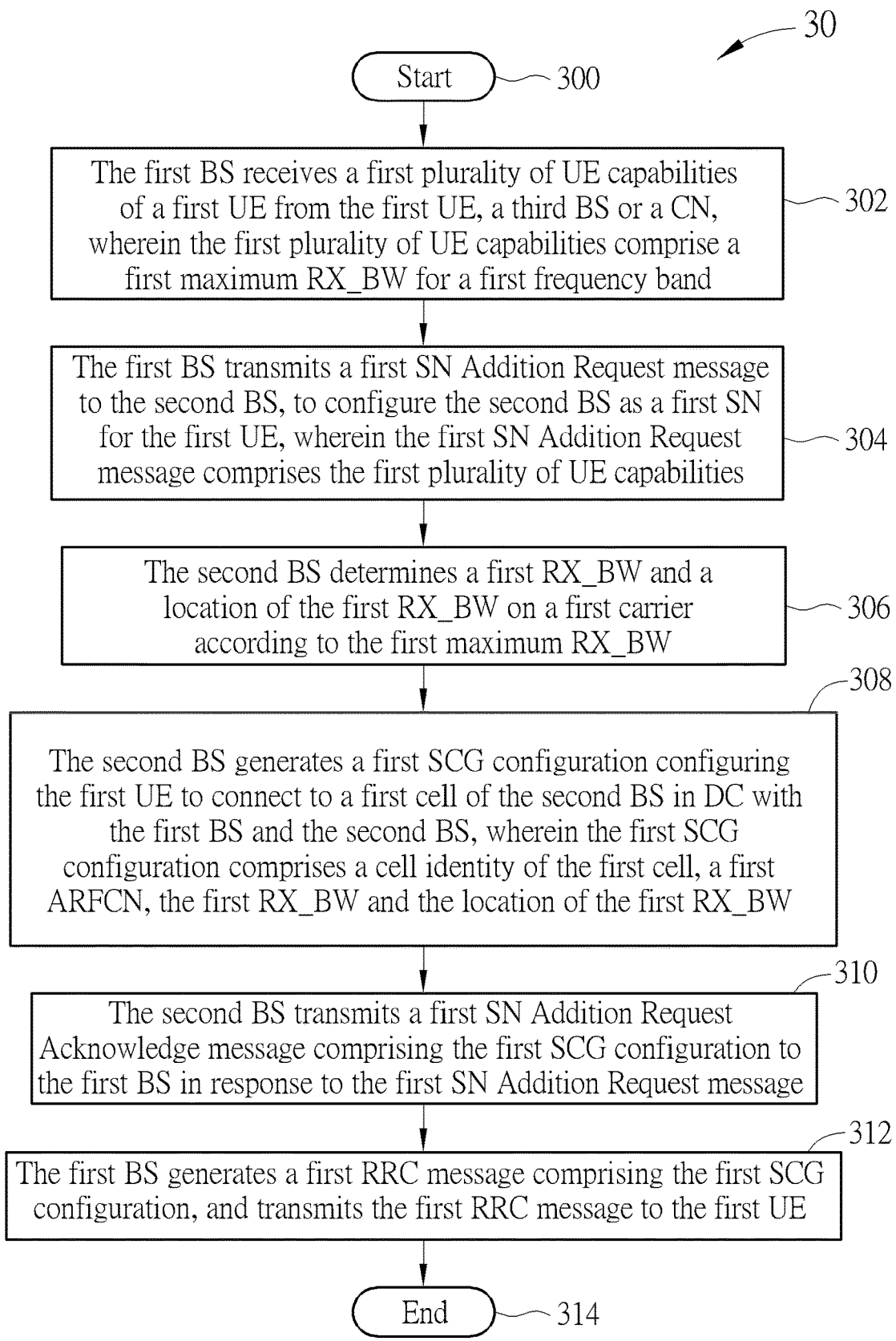
FIG. 3 is a flowchart of a process according to an example of the present invention.

A process 30 in FIG. 3 is utilized in a network comprising a first BS and a second BS shown in FIG. 1, and includes the following steps:

Step 300: Start.

Step 302: The first BS receives a first plurality of UE capabilities of a first UE from the first UE, a third BS or a CN, wherein the first plurality of UE capabilities comprise a first maximum reception (RX) bandwidth (RX_BW) for a first frequency band.

Step 304: The first BS transmits a first SN Addition Request message to the second BS, to configure the second BS as a first SN for the first UE, wherein the first SN Addition Request message comprises the first plurality of UE capabilities.

Step 306: The second BS determines a first RX_BW and a location of the first RX_BW on a first carrier according to the first maximum RX_BW.

Step 308: The second BS generates a first Secondary Cell Group (SCG) configuration configuring the first UE to connect to a first cell of the second BS in DC with the first BS and the second BS, wherein the first SCG configuration comprises a cell identity of the first cell, a first absolute radiofrequency channel number (ARFCN), the first RX_BW and the location of the first RX_BW.

Step 310: The second BS transmits a first SN Addition Request Acknowledge message comprising the first SCG configuration to the first BS in response to the first SN Addition Request message.

Step 312: The first BS generates a first radio resource control (RRC) message comprising the first SCG configuration, and transmits the first RRC message to the first UE.

Step 314: End.

In one example, the first SCG configuration is an information element (IE). For example, the first SCG configuration is a NR RRC IE. In one example, the first SCG configuration is a second RRC message. In one example, the second BS transmits the second RRC message including the first SCG configuration to the first BS. For example, the first RRC message is a long-term evolution (LTE) RRC message (e.g., LTE RRC Connection Reconfiguration message), and the second RRC message is a NR RRC message (e.g., NR RRC Reconfiguration message).

In one example, the first BS receives a first RRC response message (e.g., LTE RRC Connection Reconfiguration Complete message) from the first UE. In one example, the first RRC response message includes a second RRC response message responding to the second RRC message. The second RRC response message is a NR RRC Reconfiguration Complete message.

In one example, the first plurality of UE capabilities include a UE-NR-Capability IE, a UE-EUTRA-Capability IE and/or a UE-Multi-RAT-Dual-Connectivity (MRDC)-Capability. In one example, the CN includes an Access and Mobility Management function (AMF) or a Mobility Management Entity (MME).

In one example, the first maximum RX_BW is greater than or equal to the first RX_BW. The second BS transmits data and/or physical control signal(s) to the first UE within the first RX_BW (i.e., a bandwidth where a DL transmission spans is narrower than or equal to the first RX_BW). In one example, the first maximum RX_BW indicates a maximum RX_BW which the first UE is capable of receiving.

In one example, the first plurality of UE capabilities further include (e.g., indicate) a first maximum transmission (TX) bandwidth (TX_BW) indicating a maximum TX_BW which the first UE is capable of transmitting. The second BS may determine a first TX_BW and a location of the first TX_BW according to the first maximum TX_BW. The first TX_BW is a maximum TX_BW configured by the second BS. The first maximum TX_BW is greater than or equal to the first TX_BW. The second BS configures or schedules any transmission from the first UE within the first TX_BW (i.e., a bandwidth where an UL transmission spans is narrower than or equal to the first TX_BW).

In one example, the first SCG configuration further includes the first TX_BW and the location of the first TX_BW. In one example, the first SCG configuration further includes a second ARFCN for the first TX_BW and the location of the first TX_BW. If the first SCG configuration does not include the second ARFCN, the first UE derives the second ARFCN according to the first ARFCN in FDD.

In one example, the first ARFCN indicates the first carrier belonging to the first frequency band. In one example, the second ARFCN indicates a second carrier belonging to the first frequency band. In one example, in TDD, the second ARFCN is the same as the first ARFCN, and both of the first ARFCN and the second ARFCN indicate the first carrier. In one example, in FDD, the second ARFCN is different from the first ARFCN, and both of the first ARFCN and the second ARFCN indicate different carriers.

In one example, the first BS receives a second plurality of UE capabilities (e.g., UE-NR-Capability, UE-EUTRA-Capability and/or UE-MR-DC-Capability) of a second UE from the second UE, the third BS or the CN. In one example, the second plurality of UE capabilities include (e.g., indicate) at least one of a second maximum TX_BW and a second maximum RX_BW for the first frequency band. In one example, the second maximum RX_BW indicates a maximum RX_BW which the second UE is capable of receiving. In one example, the second maximum TX_BW is narrower than or equal to the second maximum RX_BW.

In one example, the first BS transmits a second SN Addition Request message (e.g., SgNB Addition Request message) to the second BS to configure the second BS as a second SN for the second UE. In one example, the second SN Addition Request message includes the second plurality of UE capabilities. The second BS may determine a second RX_BW and a location of the second RX_BW according to the second maximum RX_BW. The second BS may determine a second TX_BW and a location of the second TX_BW according to the second maximum TX_BW. The second BS generates a second SCG configuration configuring the second UE to connect to the first cell of the second BS in DC with the first BS (e.g., MN) and the second BS (e.g., SN), wherein the second SCG configuration includes the cell identity of the first cell, the first ARFCN, the second RX_BW and the location of the second RX_BW.

In one example, the second SCG configuration further includes the second ARFCN, the second TX_BW and the location of the second TX_BW. If the second SCG configuration does not include the second ARFCN, the second UE derives the second ARFCN according to the first ARFCN in FDD. For TDD, the second ARFCN may not be included in the second SCG configuration. The second BS may transmit a second SN Addition Request Acknowledge message (e.g., SgNB Addition Request Acknowledge message) including the second SCG configuration to the first BS in response to the second SN Addition Request message. In one example, the first BS generates a third RRC message including the second SCG configuration and transmits the third RRC message to the second UE. The first BS receives a third RRC response message from the second UE.

In one example, the second SCG configuration is an information element (IE). For example, the second SCG configuration is a NR RRC IE. In one example, the second SCG configuration is a fourth RRC message. For example, the third RRC message is a LTE RRC message (e.g., LTE RRC Connection Reconfiguration message), and the fourth RRC message is a NR RRC message (e.g., NR RRC Reconfiguration message).

In one example, the first BS receives the third RRC response message responding to the third RRC message from the second UE. For example, the third RRC response message is a LTE RRC Connection Reconfiguration Complete message. In one example, the third RRC response message includes a fourth RRC response message responding to the fourth RRC message. The fourth RRC response message is a NR RRC Reconfiguration Complete message.

In one example, the first maximum TX_BW and the second maximum TX_BW are narrower than a bandwidth of the first (or second) carrier. In one example, the first maximum TX_BW and the second maximum TX_BW are the same or different. In one example, the first maximum RX_BW and the second maximum RX_BW are the same or different. In one example, the first maximum RX_BW and the second maximum RX_BW are narrower than the bandwidth of the first (or second) carrier. In one example, the location of the first TX_BW/RX_BW and the location of the second TX_BW/RX_BW are the same or different. In one example, the location of the first TX_BW/RX_BW and the location of the second TX_BW/RX_BW are partially overlapped or non-overlapped. In one example, the location of the first TX_BW and the location of the first RX_BW on the first carrier are partially overlapped or non-overlapped. In one example, the location of the second TX_BW and the location of the second RX_BW are partially overlapped or non-overlapped.

In one example, the first BS determines (e.g., obtains, decides) that the first (or second) UE supports a default RX_BW/a default TX_BW for the first frequency band, if the first (or second) plurality of UE capabilities do not include the first (or second) maximum RX_BW/the first (or second) maximum TX_BW.

In one example, the first (or second) SCG configuration includes location information which configures the location of the first (or second) RX_BW or location information which configures the location of the first (or second) TX_BW. In one example, the location information indicates a reference position for locating (e.g., indicating) the location of the first (or second) RX_BW or the location of the first (or second) TX_BW. For example, the reference position is a starting position, a center position or an end position of the RX_BW or the TX_BW. Thus, the first (or second) UE determines the location of the first (or second) RX_BW (or the location of the first (or second) TX_BW) according to the reference position and the first (or second) RX_BW (or according to the reference position and the first (or second) TX_BW).

For example, a carrier (e.g., the first carrier or the second carrier) includes a plurality of physical resource blocks (PRBs) (e.g., N PRBs numbered from 1 (with the lowest frequency) to N (with the highest frequency), and N=200). A BW (e.g., the first (or second) RX_BW or the first (or second) TX_BW) is represented in a number of PRBs (e.g., the number of PRBs is L PRBs with L<N). The reference position may indicate a PRB number (e.g., a PRB index) indicating a specific PRB (e.g., the x-th PRB, 0<x<N) on the carrier. Then, a UE (e.g., the first UE or the second UE) determines the location according to the PRB number and the number of PRBs. For example, the PRB number is 1 (i.e., the 1st PRB) and L=25 PRBs. That is, the first (or second) RX_BW or the first (or second) TX_BW is from the 1st PRB to the 25th PRB. A number of PRBs of the first TX_BW/RX_BW and a number of PRBs of the second TX_BW/RX_BW may be the same or different. A PRB number of the first TX_BW/RX_BW and a PRB number of the second TX_BW/RX_BW may be the same or different.

In one example, the first (or second) RX_BW/TX_BW and the location information are replaced by a first (or second) starting position and a first (or second) reception/transmission end position in the first carrier. That is, the first (or second) starting position and the first (or second) reception/transmission end position indicate the first (or second) RX_BW/TX_BW and the locations of the first (or second) RX_BW/TX_BW. For example, the first (or second) starting position may be a first (or second) starting PRB number (e.g., indicating the 1st PRB of the first (or second) RX_BW/TX_BW), and the first (or second) reception/transmission end position may be a first (or second) end PRB number (e.g., indicating the last PRB of the first (or second) RX_BW/TX_BW).

For example, the first starting PRB number is 5, and the first end PRB number is 40 for the first RX_BW (i.e., 36 PRBs). For example, the second starting PRB number is 51, and the second end PRB number is 100 for the second RX_BW (i.e., 50 PRBs).

In one example, the first (or second) plurality of UE capabilities further include (e.g., indicate) at least one of the first frequency band, a second frequency band, a subcarrier spacing capability for each frequency band, a beam forming capability for each frequency band and a multiple input multiple output (MIMO) capability for each frequency band. In one example, the first plurality of UE capabilities include a third maximum RX_BW and/or a third maximum TX_BW for the second frequency band. If the third maximum RX_BW/TX_BW is not included, a default maximum RX_BW/a default maximum TX_BW is determined.

In one example, the first BS transmits a first measurement configuration to the first UE, wherein the first measurement configuration configures the first ARFCN, a first allowed measurement bandwidth and a location of the first allowed measurement bandwidth. The first BS may receive a first measurement report from the first UE, wherein the first measurement report includes at least one first measurement result which is measured by the first UE on at least one first reference signal (RS) within the first allowed measurement bandwidth at the location. The first allowed measurement bandwidth may be the same as or different from the first RX_BW. The location of the first allowed measurement bandwidth may be the same as or different from the location of the first RX_BW. The location of the first allowed measurement bandwidth and the location of the first RX_BW may be (partially or completely) overlapped or non-overlapped. For example, the location of the first allowed measurement bandwidth may or may not be within the first RX_BW.

In one example, the first measurement configuration includes location information which configures the location (position) of the first allowed measurement bandwidth. In one example, the location information indicates a reference position for locating (e.g., indicating) the location of the first allowed measurement bandwidth (e.g., a starting position, a center position or an end position of the first allowed measurement bandwidth). Thus, the first UE determines (e.g., obtains) the location of the first allowed measurement bandwidth on the first carrier according to the reference position and the first allowed measurement bandwidth.

In one example, the at least one first RS includes a primary synchronization signal (PSS), a secondary synchronization signal (SSS), physical broadcast channel (PBCH) and/or a channel state information RS (CSI-RS). In one example, each of the at least one first measurement result is in a unit of reference signal received power (RSRP) or reference signal received quality (RSRQ). The RSRP and/or RSRQ are calculated according to a plurality of measurements on at least one RS (e.g., PSS-RSRP, PSS-RSRQ, SSS-RSRP, SSS-RSRQ or SSB-RSRP). A synchronization signal block (SSB) consists of the PSS, the SSS and/or the PBCH.

In one example, the at least one first measurement result is associated to the first cell. The first measurement report includes the cell identity of the first cell, which is associated to the at least one first measurement result.

In one example, the at least one first measurement result is associated to at least one SSB index (number or identity). The at least one SSB index indicates SSB(s) or RS(s) in the SSB(s) measured by a UE (e.g., the first UE or the second UE) to get the at least one first measurement result. The first measurement report may include the at least one SSB index.

In one example, a measurement result in the at least one first measurement result is associated to a CSI-RS configuration configuring at least one CSI-RS. In one example, the first measurement report or the measurement result may include a CSI-RS configuration identity of the CSI-RS configuration, which is associated to the measurement result.

In one example, the first UE connects to the first BS, and has a first Signaling Radio Bearer (SRB) with the first BS. The first UE receives the first RRC message and the first measurement configuration on the first SRB from the first BS. The first UE transmits the first RRC response message on the first SRB to the first BS. In one example, the second UE connects to the first BS, and has a second SRB with the first BS. The second UE receives the third RRC message on the second SRB from the first BS. The second UE transmits the third RRC response message on the second SRB to the first BS.

In one example, the first BS determines the location of the first allowed measurement bandwidth according to the first plurality of UE capacities. In one example, the first BS determines the location of the first allowed measurement bandwidth according to a scheduling algorithm or a traffic offloading or dispersion algorithm in addition to the first plurality of UE capacities.

In one example, when the first (or second) UE receives the first (or second) SCG configuration, the first (or second) UE performs at least one reception with the second BS in the location of the first (or second) RX_BW according to the first (or second) RX_BW. In one example, the first (or second) UE performs at least one reception with the first BS within a third RX_BW at a location on a third carrier belonging to a third frequency band. In one example, the first (or second) UE performs at least one transmission with the first BS within a third TX_BW at a location on a fourth carrier belonging to the third frequency band. The first (or second) UE may transmit the first (or third) RRC response message to the first BS within the third TX_BW.

In one example, the first measurement configuration and the first measurement report includes a first measurement identity. In one example, the first SN Addition Request message includes the at least one first measurement result and at least one identity (e.g., the cell identity) associated to the at least one first measurement result as described above.

In one example, the second BS determines the location of the first RX_BW according to the at least one first measurement result.

In one example, the second BS determines the location of the first RX_BW according to at least one of a scheduling algorithm, a traffic offloading or dispersion algorithm and a QoS profile. It should be noted that the second BS may determine the location of the first RX_BW according to a combination of the parameters described above.

In one example, the second BS configures a SCG SRB via the first BS to the first UE such that the first UE and the second BS can exchange RRC messages directly with each other. In one example, the second BS transmits a second measurement configuration in a fifth RRC message (e.g., a NR RRC Reconfiguration message) to the first UE on the SCG SRB. The first UE may transmit a fifth RRC response message (e.g., a NR RRC Reconfiguration Complete message) on the SCG SRB to the second BS in response to the fifth RRC message. The second measurement configuration configures a third ARFCN, a second allowed measurement bandwidth and a location of the second allowed measurement bandwidth. The second BS may receive a second measurement report on the SCG SRB from the first UE, wherein the second measurement report includes at least one second measurement result which is measured by the first UE on at least one second RS within the second allowed measurement bandwidth at the location.

In one example, the second allowed measurement bandwidth is the same as or different from the first RX_BW or the first allowed measurement bandwidth. In one example, the location of the second allowed measurement bandwidth is the same as or different from the location of the first RX_BW or the location of the first allowed measurement bandwidth. In one example, the location of the second allowed measurement bandwidth and the location of the first RX_BW are (partially or completely) overlapped or non-overlapped. In one example, the at least one second RS is the same as or different from the at least one first RS. In one example, the third ARFCN is the same as or different from the first ARFCN.

In one example, the first BS transmits a first measurement gap configuration to the first UE. The first UE may measure the at least one first RS at the location of the first allowed measurement bandwidth in gaps configured in the first measurement gap configuration, to get the at least one first measurement result. The first UE may not measure the at least one first RS at the location of the first allowed measurement bandwidth without gaps, before the first UE connects to the second BS according to the first SCG configuration. The first UE may measure the at least one first RS at the location of the first allowed measurement bandwidth without gaps, when the first UE connects to the second BS according to the first SCG configuration.

In one example, the first UE measures the at least one second RS at the location of the second allowed measurement bandwidth in gaps configured in the first measurement gap configuration, to get the at least one second measurement result. In one example, the second BS transmits a second measurement gap configuration to the first UE. The first UE may measure the at least one second RS at the location of the second allowed measurement bandwidth in gaps configured in the second measurement gap configuration, to get the at least one second measurement result, and may not measure the at least one second RS at the location of the second allowed measurement bandwidth without gaps.

In one example, the second BS transmits a sixth RRC message (e.g., NR RRC Reconfiguration message) on the SCG SRB to the first UE in response to the at least one second measurement result. The first UE may transmit a sixth RRC response message on the SCG SRB to the second BS. The sixth RRC message may configure a fourth RX_BW and a location of the fourth RX_BW on the first carrier. In one example, the first UE performs at least one reception at the location of the fourth RX_BW with the second BS in response to the sixth RRC message. In one example, the sixth RRC message configures a fourth TX_BW and a location of the fourth TX_BW within the second carrier. The first UE may perform at least one transmission at the location of the fourth TX_BW with the second BS in response to the sixth RRC message.

In one example, the fourth RX_BW and the second allowed measurement bandwidth are the same or different. In one example, the fourth RX_BW and the second allowed measurement bandwidth are (partially or completely) overlapped or non-overlapped. In one example, the location of the fourth RX_BW and the location of the second allowed measurement bandwidth are the same or different.

In one example, the at least on transmission and the at least one reception include control signal(s) and data. In one example, the control signal (s) transmitted by the UE includes sounding RS(s), Hybrid Automatic Repeat Request (HARQ) ACK, HARQ NACK and/or CSI on physical UL control channel(s) (PUCCH(s)). In one example, the data includes physical UL shared channel (PUSCH) transmissions. In one example, the control signal(s) is transmitted by the BS on physical DL control channel(s) (PDCCH(s)). In one example, the at least one transmission includes physical DL shared channel (PDSCH) transmission(s).

Figure 4:
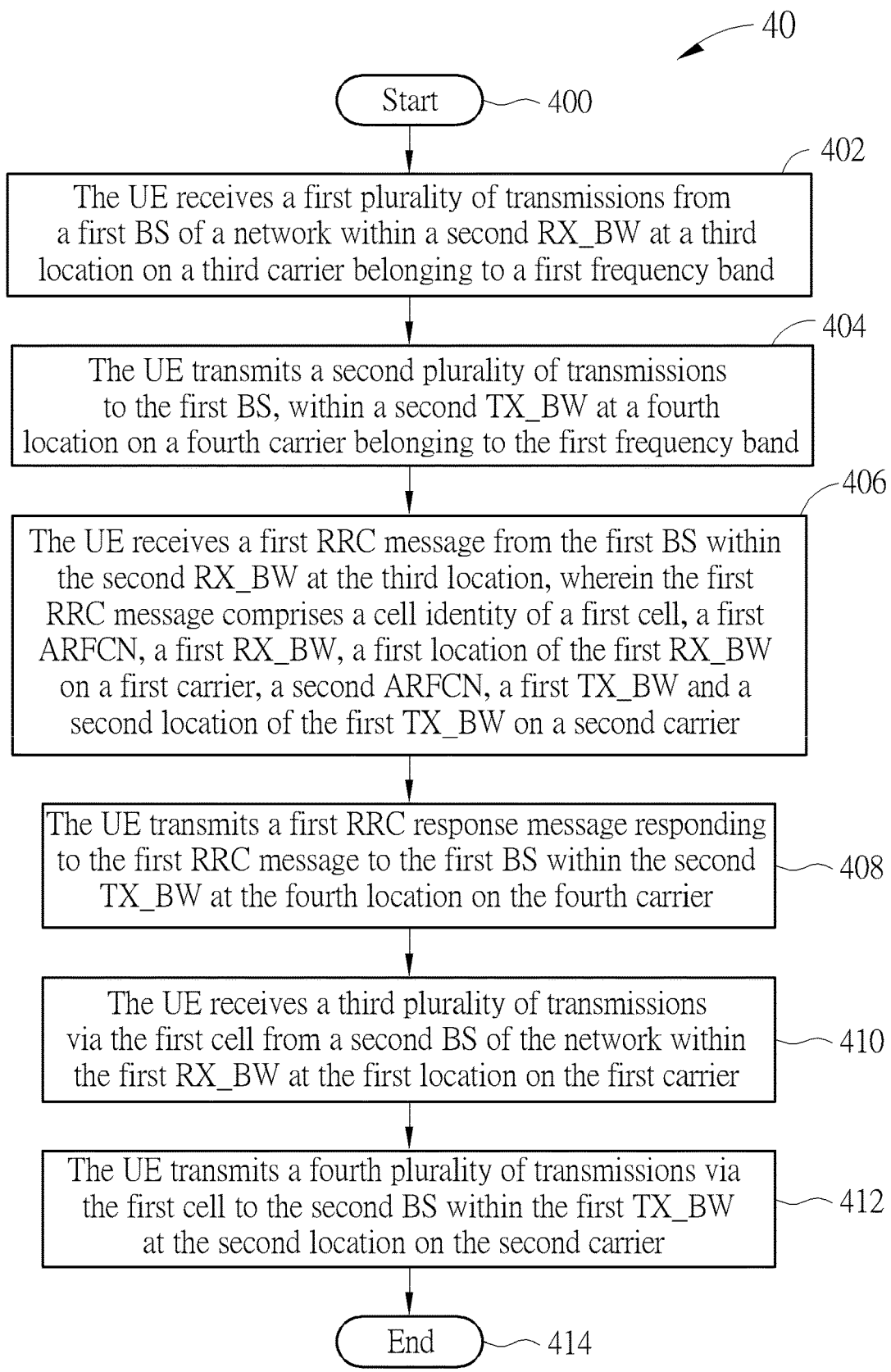
FIG. 4 is a flowchart of a process according to an example of the present invention.

A process 40 in FIG. 4 is utilized in a UE, and includes the following steps:

Step 400: Start.

Step 402: The UE receives a first plurality of transmissions from a first BS of a network within a second RX_BW at a third location on a third carrier belonging to a first frequency band.

Step 404: The UE transmits a second plurality of transmissions to the first BS, within a second TX_BW at a fourth location on a fourth carrier belonging to the first frequency band.

Step 406: The UE receives a first RRC message from the first BS within the second RX_BW at the third location, wherein the first RRC message comprises a cell identity of a first cell, a first ARFCN, a first RX_BW, a first location of the first RX_BW on a first carrier, a second ARFCN, a first TX_BW and a second location of the first TX_BW on a second carrier.

Step 408: The UE transmits a first RRC response message responding to the first RRC message to the first BS within the second TX_BW at the fourth location on the fourth carrier.

Step 410: The UE receives a third plurality of transmissions via the first cell from a second BS of the network within the first RX_BW at the first location on the first carrier.

Step 412: The UE transmits a fourth plurality of transmissions via the first cell to the second BS within the first TX_BW at the second location on the second carrier.

Step 414: End.

In one example, the first ARFCN indicates the first carrier, and the second ARFCN indicates the second carrier. In one example, the second ARFCN is omitted in TDD (i.e., the first ARFCN and the second ARFCN are the same). In one example, the carriers above are the same or different. In one example, the second RX_BW is greater than or equal to the second TX_BW. In one example, the UE transmits a plurality of UE capabilities to the first BS within the second TX_BW at the fourth location. In one example, the plurality of UE capabilities indicates (e.g., includes) a maximum RX_BW for a second frequency band to which the first carrier and the second carrier belong. In one example, the plurality of UE capabilities indicates (e.g., includes) a maximum TX_BW for the second frequency band. In one example, the plurality of UE capabilities indicate (e.g., include) a maximum RX_BW for a third frequency band to which the first carrier belongs. In one example, the plurality of UE capabilities indicate (e.g., include) a maximum TX_BW for the third frequency band to which the second carrier belongs.

In one example, the UE determines (e.g., obtains, decides) the second RX_BW according to at least one of a maximum RX_BW (i.e., capability) for the first frequency band and the first frequency band. In one example, the UE determines a location of the third carrier according to a third ARFCN. The UE may search the location of the third carrier by detecting a PSS, a SSS and/or a PBCH.

In one example, the UE determines (e.g., obtains, decides) the second TX_BW according to at least one of a maximum TX_BW (i.e., capability) for the first frequency band and the first frequency band. In one example, the first BS broadcasts information of the second TX_BW in the PBCH or a first system information block (SIB) at the third location. In one example, the UE determines a location of the fourth carrier according to a fourth ARFCN. The UE may receive the fourth ARFCN from the PBCH, the first SIB or a second SIB broadcasted by the first BS at the third location. In one example, the UE determines the fourth ARFCN according to the third ARFCN, if the first BS does not broadcast the fourth ARFCN. The UE may receive information of the fourth location from the PBCH, the first SIB or the second SIB broadcasted by the first BS.

In one example, the UE receives at least one configuration indicating (e.g., including) at least one of the second RX_BW, the third location, the second TX_BW, the fourth location, the third ARFCN and the fourth ARFCN from a BS (e.g., the first BS or other BS) in a RRC message (e.g., a LTE RRCConnectionReconfiguration message).

Those skilled in the art should readily make combinations, modifications and/or alterations on the abovementioned description and examples. For example, the skilled person easily makes new embodiments of the network based on the embodiments and examples of the UE, and makes new embodiments of the UE based on the embodiments and examples of the network. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20. Any of the above processes and examples above may be compiled into the program codes 214.

To sum up, the present invention provides a method and a communication device for configuring a SN and reporting in DC. Thus, the problem how a network including a plurality of BSs and a UE configure the SN for the UE is solved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A network comprising a first base station (BS) and a second BS for Dual Connectivity (DC), comprising:
    the first BS receiving a plurality of communication device capabilities of a communication device from the communication device, a third BS or a core network (CN), wherein the plurality of communication device capabilities comprise a maximum reception bandwidth (RX_BW) for a frequency band;
    the first BS transmitting a Secondary Node (SN) Addition Request message to the second BS, to configure the second BS as a first SN for the communication device, wherein the SN Addition Request message comprises the plurality of communication device capabilities;
    the second BS determining a RX_BW and a location of the RX_BW on a first carrier according to the maximum RX_BW;
    the second BS generating a Secondary Cell Group (SCG) configuration configuring the communication device to connect to a cell of the second BS in DC with the first BS and the second BS, wherein the SCG configuration comprises a cell identity of the cell, a first absolute radiofrequency channel number (ARFCN), the RX_BW and the location of the RX_BW;
    the second BS transmitting a SN Addition Request Acknowledge message comprising the SCG configuration to the first BS in response to the SN Addition Request message; and
    the first BS generating a radio resource control (RRC) message comprising the SCG configuration, and transmitting the RRC message to the communication device.

2. The network of claim 1, wherein the maximum RX_BW is greater than or equal to the RX_BW.

3. The network of claim 1, wherein the plurality of communication device capabilities further comprise a maximum transmission bandwidth (TX_BW) indicating a maximum TX_BW which the communication device is capable of performing a transmission.

4. The network of claim 1, wherein the second BS determining a TX_BW and a location of the TX_BW on a second carrier according to a maximum TX_BW, wherein the SCG configuration comprises the TX_BW and the location of the TX_BW.

5. The network of claim 1, wherein the SCG configuration comprises a second ARFCN for the TX_BW and the location of the TX_BW.

6. The network of claim 1, wherein the first BS transmits a measurement configuration to the communication device, wherein the measurement configuration configures the first ARFCN, a allowed measurement bandwidth and a location of the allowed measurement bandwidth.

7. A communication device for Dual Connectivity (DC), comprising:
    at least one storage device; and
    at least one processing circuit, coupled to the at least one storage device, wherein the at least one storage device stores, and the at least one processing circuit is configured to execute instructions of:
    receiving a first plurality of transmissions from a first base station (BS) of a network at a third location in a second reception bandwidth (RX_BW) on a third carrier belonging to a frequency band;
    transmitting a second plurality of transmissions to the first BS at a fourth location in a second transmission bandwidth (TX_BW) on a fourth carrier belonging to the frequency band;
    receiving a radio resource control (RRC) message from the first BS at the third location in the second RX_BW, wherein the RRC message comprises a cell identity of a cell, a first absolute radiofrequency channel number (ARFCN), a first RX_BW, a first location of the first RX_BW on a first carrier, a second ARFCN, a first TX_BW and a second location of the first TX_BW on a second carrier;
    transmitting a RRC response message responding to the RRC message to the first BS at the fourth location in the second TX_BW on the fourth carrier;
    receiving a third plurality of transmissions via the cell from a second BS of the network at the first location in the first RX_BW on the first carrier; and
    transmitting a fourth plurality of transmissions via the cell to the second BS at the second location in the first TX_BW on the second carrier.

8. The communication device of claim 7, wherein the second RX_BW is greater than or equal to the second TX_BW.

9. The communication device of claim 7, wherein the communication device transmits a plurality of communication device capabilities to the first BS at the fourth location in the second TX_BW.

10. The communication device of claim 7, wherein the communication device determines the second RX_BW according to at least one of a maximum RX_BW for the frequency band and the frequency band.

11. The communication device of claim 7, wherein the communication device determines the second TX_BW according to at least one of a maximum TX_BW for the frequency band and the frequency band.

* * * * *